United States Patent Office 3,481,992
Patented Dec. 2, 1969

3,481,992
PREPARATION OF HALOHYDRINS BY THERMAL REARRANGEMENT OF ALKYL HYPOHALITES
Edward L. Jenner, Wilmington, Del., assignor to E. I. du Pont de Nemours and Company, Wilmington, Del., a corporation of Delaware
No Drawing. Original application May 31, 1961, Ser. No. 113,659. Divided and this application July 11, 1966, Ser. No. 563,972
Int. Cl. C07c 31/34
U.S. Cl. 260—633                    7 Claims

ABSTRACT OF THE DISCLOSURE

Described and claimed is the process for preparing a halohydrin by the thermal rearrangement of an alkyl hypohalite having a carbon-hydrogen group delta to the hypohalite group, e.g., rearranging n-butyl hypochlorite to tetramethylene chlorohydrin at 60–80° C.

RELATED APPLICATION

This application is a division of my copending application Ser. No. 113,659, filed May 31, 1961, and now abandoned.

FIELD OF THE INVENTION

This invention relates to, and has as its principal object provision of, a novel method for preparing certain halohydrins and tetrahydrofurans.

DESCRIPTION OF THE INVENTION

The dual functionality of the halohydrins makes this class of compounds valuable in synthetic operations. In this invention for example a halohydrin having four carbons between the halogen and hydroxyl groups is converted to a tetrahydrofuran. Because of such facts there is considerable interest in finding new methods which produce halohydrins in better yields and at lower cost.

According to this invention certain alkyl hypohalites containing at least four carbon atoms and at least one hydrogen atom on the carbon delta with respect to the hypohalite —OX, group are converted to halohydrins by homolytic decomposition, or rearrangement, through chemical activation by heat in the liquid or vapor phase. A general equation for the reaction occurring in either case may be written as follows:

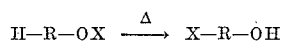

where R is an alkylene group with four or more carbons, the depicted hydrogen being initially on the delta carbon, and X is halogen of atomic number 17 to 36, i.e., chlorine or bromine.

The immediate over-all process is a free-radical chain reaction and may be pictured, somewhat schematically but in more effective detail, as follows:

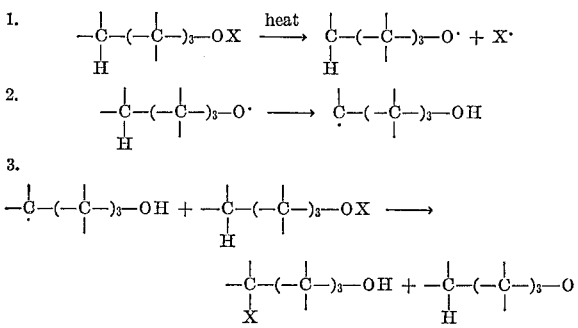

Here Equation 1 shows the initiation step and Equations 2 and 3, chain propagation. Equation 2 is an intramolecular radical attack, in effect, a radical rearrangement. Equation 3 represents the product-forming step, also yielding a new radical to carry on the chain. Since this is a chain reaction, a great many molecules can be converted by the processes of Equations 2 and 3 for every occurrence of the process of Equation 1.

A temperature in the range of around 50–100° C. is generally employed in the process and operations are usually in the liquid phase. Higher temperatures and the gas phase can be employed, however.

Alkyl hypohalites useful in the present invention are those with at least four carbon atoms and at least one hydrogen on the carbon delta to the hypohalite group. Because of their ready availability and ease of preparation, the preferred alkyl hypohalites are those in which the alkyl group contains up to 18 carbon atoms. Specific examples of usable hypohalites are n-pentyl hypochlorite, 4-methylpentyl hypochlorite, n-butyl hypobromite, n-octyl hypobromite, 5-ethyl-6-methylheptyl hypochlorite, n-octyl hypochlorite, n-dodecyl hypochlorite, n-octadecyl hypochlorite, and the like.

These precursor hypohalites can be made by chlorinating or brominating the appropriate alcohol in an aqueous alkaline medium, e.g., aqueous sodium or potassium hydroxide, with elemental chlorine or bromine. Other aqueous media can also be used, including aqueous solutions of alkali metal carbonates and aqueous suspensions of alkaline earth metal hydroxides. Still other preparatory methods are available. For instance, the compounds can be prepared in nonaqueous media, e.g., ether, choroform, carbon tetrachloride, etc., by reaction of the corresponding alcohol with chlorine monoxide or with solution of anhydrous hypochlorous acid in the mentioned solvents. A particularly convenient preparation of the alkyl hypochlorites and hypobromites is by acidification of a solution of the alcohol in an aqueous solution of an alkali, or alkaline earth, hypochlorite or hypobromite.

In accomplishing the present reaction in the liquid phase, the hypohalite may be heated in bulk if so desired. Generally, however, it is more convenient to dissolve the hypohalite in a suitable solvent and then subject the solution to heat. Suitable solvents are the normally liquid organic reaction media, e.g., carbon tetrachloride, chlorobenzene, benzene, and the like. The amount of solvent or reaction medium employed is not critical but usually is sufficient to produce a solution 0.05 to 5 molar in hypohalite content.

The liquid phase decomposition is usually effected by heating the bulk hypohalite or solution at 50° to 100° C. for periods of time ranging from 1 to 120 minutes. Longer periods, of course, can be used but confer little or no advantage since the rearrangement is essentially complete in time as short as 5 to 60 minutes. Higher temperatures can also be used but likewise confer little advantage. Usually the thermal rearrangement occurs readily at temperatures of from 60° to 80° C. and this range represents the temperatures within which the process is most generally carried out. Pressure is immaterial in the liquid phase process and is usually ambient atmospheric. After reaction, the product is separated as desired.

In accomplishing the reaction in the vapor phase, the hypohalite, i.e., hypochlorite or hypobromite, is conveniently entrained in a stream of carrier gas and the gas and entrained hypohalite passed through a heated reaction zone. Carrier gases suitable in this procedure are inert gases, i.e., those unreactive with the hypohalite or the reaction products and include helium, nitrogen, argon, and the like. Time and temperature conditions are generally the same as those given above for the liquid-phase process. Pressure will generally be ambient atmospheric when a carrier gas is used but can be either above or below atmospheric, if desired. A procedure alternative to the use of a carrier gas is operation under reduced pressure permitting the hypohalite to enter the reaction zone under its own vapor pressure. In either procedure, condensible products can be isolated from the gas effluent from the reaction zone in a trap cooled by solid carbon dioxide.

The invention provides a convenient way for preparing alkylene chlorohydrins and bromohydrins, e.g., α-chloro- and -bromoalcohols, in a good yield and in a high state of purity. These are readily converted to tetrahydrofurans by heating with a base, e.g., as according to the equation:

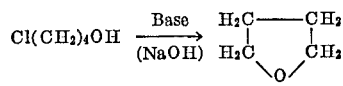

Either solid alkali or alkaline earth hyroxides or their aqueous solutions may be used in this conversion.

The procedures of this invention have been generally discussed with reference to a separation of the various intermediate products. That this separation is nonessential will be readily understood. Thus, it is possible to start with the appropriate alcohol, convert it to the hypohalite, and without isolating the hypohalite convert the same to the halohydrin and, if desired, the latter to the tetrahydrofuran directly. The process can be stopped at any step.

EMBODIMENTS OF THE INVENTION

There follow some examples which are intended to illustrate, but not to limit, the invention. For convenience, n-butyl hypochlorite has been employed in these examples as typical but, of course, other alkyl hypohalites of the previously defined structure may be used as well. The compositions of the reaction mixtures were determined by gas chromatography and the percentages given are values calculated on the basis of peak areas without using any correction factor. All pressures employed were ambient atmospheric and temperatures were ambient or around the boiling point of benzene as evident unless

EXAMPLE 1 n-Butyl hypochlorite was prepared by adding 5 ml. of acetic acid and 5 ml. of butyl alcohol to 75 ml. of 0.75 M sodium hypochlorite. The hypochlorite was extracted by 25 ml. of benzene (in the dark) and the benzene solution was heated on a hot plate. An exothermic reaction occurred, boiling away a portion of the reaction mixture (ca. 80–85° C.). Gas chromatographic analysis of the residue showed it to contain 7% tetramethylene chlorohydrin.

EXAMPLE 2 arated, washed with aqueous sodium bicarbonate solution, and dried over anhydrous sodium sulfate. The resulting benzene solution was refluxed for 80 minutes, whereupon the yellow color of the hypochlorite disappeared completely. To the reaction mixture there was added 10 g. of solid potassium hydroxide (85%), and the mixture was refluxed for an additional hour. The mixture was distilled and the distillate dried over magnesium sulfate. Gas chromatography of the dry distillate showed it to contain 3% tetrahydrofuran.

EXAMPLE 3

A solution of n-butyl hypochlorite in benzene was prepared by adding 67 ml. of acetic acid to an ice-cooled solution of 67 ml. of n-butyl alcohol and 1000 ml. of 0.7 M sodium hypochlorite. The hydrochlorite was extracted with 200 ml. of benzene and the benzene extract was washed with aqueous sodium bicarbonate solution. The resulting solution of n-butyl hypochlorite in benzene was added over an eight-minute period, to 250 ml. of boiling benzene (ca. 78–80° C.). The mixture was heated for an n-Butyl hydrochlorite was prepared by adding 20 ml. of acetic acid and 20 ml. of n-butyl alcohol to 300 ml. of 0.75 M sodium hypochlorite. One-hundred twenty milliliters of benzene was added to the reaction mixture to extract the hypochlorite. The benzene solution was separated additional two hours. Fifty-five milliliters of 20 M sodium hydroxide was added, and the mixture was heated for an additional hour. The benzene layer was separated and dried over anhydrous magnesium sulfate. It was found by gas chromatographic assay to contain 0.8% tetrahydrofuran.

EXAMPLE 4 n-Butyl hypochlorite was prepared by adding 67 ml. of n-butanol, 400 ml. of benzene, and 67 ml. of acetic acid to a mixture of 1000 ml. of 0.76 M sodium hypochlorite otherwise noted.

and 200 g. of ice. The benzene solution of n-butyl hypochlorite was separated, and the aqueous fraction was washed twice with 50-ml. portions of benzene. The combined benzene solutions were washed with aqueous sodium bicarbonate solution and dried over anhydrous sodium sulfate. The resulting dry benzene solution (550 ml.), was 1.14 M in n-butyl hypochlorite, as determined by titration. To this solution was added 70 g. of dry sodium bicarbonate, and the resulting slurry was heated under reflux for 50 minutes with good agitation. During this period, carbon dioxide was evolved. The solution was filtered and the precipitate washed with benzene. The benzene solution was then distilled, whereupon 690 ml. of benzene and low-boiling materials were obtained. The residue was fractionally distilled through a Vigreux column.

| Fraction: | G. | B.P. | $n_D^{25}$ |
|---|---|---|---|
| 1 | 4.7 | 35–50° C./12 mm | 1.4119 |
| 2 | 8.6 | 54–71° C./8 mm | 1.4278 |
| 3 [1] | 9.2 | 38–50° C./1 mm | 1.4465 |
| R | 7.0 | | 1.4712 |

[1] This fraction analyzed 83% tetramethylene chlorohydrin.

This benzene fraction and the three fractions obtained by distillation under reduced pressure were all assayed by gas chromatography. From these data the composition of the total product and the yield of various products were calculated.

Yield based on n-butyl hypochlorite, percent n-Butanol, 23.1 g. ---- 49
Tetramethylene chlorohydrin, 10.6 g. ---- 16
Butyl butyrate, 8.9 g. ---- 20

A portion of fraction 3 was refluxed with half its volume of 20 M sodium hydroxide solution. Distillation of this mixture gave crude tetrahydrofuran, B.P. 60–68° C.; $n_D^{25}$, 1.4030. This material was dried to yield tetrahydrofuran, identified by its infrared spectrum.

Table I presents structures of hypohalites and of halohydrins and tetrahydrofurans available from them by this process.

TABLE I

| Hypohalite | Halohydrin produced | Tetrahydrofuran produced |
|---|---|---|
| $CH_3(CH_2)_4OBr$ <br> n-Pentyl hypobromite | $CH_3-CH-(CH_2)_3OH$ <br> \|<br>Br <br> 4-bromopentanol | 2-methyltetrahydrofuran. |
| $CH_3-CH_2-CH-CH_2-OCl$ <br> \|<br>$CH_3$ <br> 2-methylbutyl hypochlorite | $CH_3-CH_2-CH-CH_2OH$ <br> \| \|<br>Cl $CH_3$ <br> 2-methyl-4-chlorobutanol | 3-methyltetrahydrofuran. |
| $CH_3-(CH_2)_2-CH-CH_3$ <br> \|<br>OCl <br> 1-methylbutyl hypochlorite | $CH_2-(CH_2)_2-CH-CH_3$ <br> \| \|<br>Cl OH <br> 1-methyl-4-chlorobutanol | 2-methyltetrahydrofuran. |
| Cyclohexyl hypochlorite (cyclohexyl ring with OCl) | 4-chlorocyclohexanol | 7-oxabicyclo[2.2.1]-heptane. |
| $CH_3-CH-(CH_2)_3OCl$ <br> \|<br>$CH_3$ <br> 4-methylpentyl hypochlorite | $CH_3-\overset{CH_3}{\underset{Cl}{C}}-(CH_2)_3OH$ <br> 4-methyl-4-chloropentanol | 2,2-dimethyl-tetrahydrofuran. |
| $C_6H_5(CH_2)_4-OCl$ <br> 4-phenylbutyl hypochlorite | $C_6H_5-CH-(CH_2)_3OH$ <br> \|<br>Cl <br> 4-phenyl-4-chlorobutanol | 2-phenyltetrahydrofuran. |

In the above table, the "tetrahydrofuran" nomenclature has been used in all but one instance for the sake of convenience. It will be understood, however, that "oxolan" or "oxacyclopentane" could be employed instead of "tetrahydrofuran" if desired, and the derivatives named accordingly.

What is claimed is:
1. The process for preparing an alpha-delta halohydrin which comprises homolytically rearranging a compound of the group consisting of alkyl hypochlorites and alkyl hypobromites containing from four to eighteen carbon atoms and containing at least one hydrogen on the carbon delta to the hypohalite group by exposure of the same to heat energy in the range of 50°–100° C.
2. The process of claim 1 accomplished in the liquid phase.
3. The process of claim 1 wherein the compound is a hypochlorite.
4. The process of claim 1 wherein the alkyl compound is an n-butyl hypohalite.
5. The process of claim 4 wherein the compound is n-butyl hypochlorite which is rearranged to tetramethylene chlorohydrin.
6. The process of claim 5 wherein the hypochlorite is admixed with an inert organic reaction medium.
7. The process of claim 5 wherein the temperature is about 60–80° C.

References Cited

UNITED STATES PATENTS 2,675,402   4/1954   Englund _____ 260—633
3,298,941   1/1967   Barton _____ 204—158

OTHER REFERENCES

Strukov, Chemical Abstracts, vol. 30, p. 1769 (1936).
Greene et al., J. Am. Chem. Soc., vol. 83, pp. 2196–8 (May 5, 1961).

ALEX MAZEL, Primary Examiner
BERNARD I. DENTZ, Assistant Examiner

U.S. Cl. X.R.
260—346.1

PO-1050
(5/69)

UNITED STATES PATENT OFFICE
CERTIFICATE OF CORRECTION

Patent No. 3,481,992             Dated December 2, 1969

Inventor(s) Edward L. Jenner

It is certified that error appears in the above-identified patent and that said Letters Patent are hereby corrected as shown below:

Column 3, line 66 insert -- otherwise noted.--

Column 4, line 2 as the beginning of Example 2, insert:

-- n-Butyl hydrochlorite was prepared by adding 20 ml. of acetic acid and 20 ml. of n-butyl alcohol to 300 ml. of 0.75 M sodium hypochlorite. One-hundred twenty milliliters of benzene was added to the reaction mixture to extract the hypochlorite. The benzene solution was sep- --

Column 4, lines 24-28, delete:

"n-Butyl hydrochlorite was prepared by adding 20 ml. of acetic acid and 20 ml. of n-butyl alcohol to 300 ml. of 0.75 M sodium hypochlorite. One-hundred twenty milliliters of benzene was added to the reaction mixture to extract the hypochlorite. The benzene solution was sep-"

Column 4, line 39 delete "otherwise noted."

Column 5, line 67, Claim 4 delete "alkyl".

SIGNED AND SEALED
JUN 23 1970

(SEAL)
Attest:

Edward M. Fletcher, Jr.
Attesting Officer

WILLIAM E. SCHUYLER, JR.
Commissioner of Patents